(12) United States Patent
Demmer et al.

(10) Patent No.: US 8,882,185 B2
(45) Date of Patent: Nov. 11, 2014

(54) MODULAR CONSTRUCTION SYSTEM AND METHOD FOR PRODUCING A ROOF MODULE

(75) Inventors: Achim Demmer, Magstadt (DE); Christina Nestler, Ostelsheim (DE); Juergen Schrader, Weil im Schoenbuch (DE); Andreas Zygan, Malsch (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 13/388,200

(22) PCT Filed: Jun. 18, 2010

(86) PCT No.: PCT/EP2010/003687
§ 371 (c)(1),
(2), (4) Date: Mar. 5, 2012

(87) PCT Pub. No.: WO2011/015256
PCT Pub. Date: Feb. 10, 2011

(65) Prior Publication Data
US 2012/0153684 A1    Jun. 21, 2012

(30) Foreign Application Priority Data
Aug. 1, 2009    (DE) .......................... 10 2009 035 733

(51) Int. Cl.
*B60J 7/00*    (2006.01)
*B60J 7/02*    (2006.01)
*B62D 25/06*    (2006.01)
*B60J 7/043*    (2006.01)

(52) U.S. Cl.
CPC .................. *B62D 25/06* (2013.01); *B60J 7/022* (2013.01); *B60J 7/0435* (2013.01)
USPC .................................................... 296/216.01

(58) Field of Classification Search
USPC ............................................. 296/216.01, 218
See application file for complete search history.

(56) References Cited

U.S. PATENT DOCUMENTS

| | | | | |
|---|---|---|---|---|
| 3,979,148 A | * | 9/1976 | Martin | 296/215 |
| 4,121,870 A | * | 10/1978 | Oakey | 296/215 |
| 5,642,915 A | * | 7/1997 | Ackermann et al. | 296/214 |
| 6,039,390 A | * | 3/2000 | Agrawal et al. | 296/211 |
| 6,893,083 B2 | * | 5/2005 | Engl | 296/216.03 |
| 6,974,183 B2 | * | 12/2005 | Bergmiller et al. | 296/220.01 |
| 7,077,462 B1 | | 7/2006 | De Gaillard | |

(Continued)

FOREIGN PATENT DOCUMENTS

| | | |
|---|---|---|
| DE | 102 28 410 A1 | 1/2004 |
| EP | 0 709 244 A1 | 5/1996 |

(Continued)

OTHER PUBLICATIONS

Corresponding International Search Report with English Translation dated Nov. 30, 2010 (six (6) pages).

*Primary Examiner* — Dennis H Pedder
(74) *Attorney, Agent, or Firm* — Crowell & Moring LLP

(57) ABSTRACT

A modular construction system for producing a plurality of design variants of a roof module for a motor car includes a plurality of design-variant-specific adapter elements and a plurality of design-variant-specific planar elements. Using at least one adapter element, at least one respective planar element can be connected to a frame, forming a roof opening, in particular of a motor car shell.

7 Claims, 3 Drawing Sheets

(56) References Cited

U.S. PATENT DOCUMENTS

| | | |
|---|---|---|
| 7,108,317 B2 * | 9/2006 | Tamura et al. ............... 296/218 |
| 7,237,835 B2 * | 7/2007 | Leroy et al. ............. 296/216.01 |
| 7,404,587 B2 * | 7/2008 | Brockhoff ............... 296/107.17 |
| 7,597,379 B2 | 10/2009 | Beierl et al. |
| 7,922,242 B2 * | 4/2011 | Comfort et al. .......... 296/216.08 |
| 7,954,889 B2 * | 6/2011 | Seemann et al. ......... 296/216.01 |
| 2008/0106124 A1 * | 5/2008 | Snider .......................... 296/215 |

FOREIGN PATENT DOCUMENTS

| | | | |
|---|---|---|---|
| EP | 1 897 733 A1 | | 3/2008 |
| EP | 1974968 A2 | * | 3/2008 |
| EP | 1 974 968 A2 | | 10/2008 |
| GB | 2184404 | * | 6/1987 |
| WO | WO 01/94141 A1 | | 12/2001 |

\* cited by examiner

Sliding Roof
505

Panoramic Glass Roof
510

Lifting and Sliding Roof
515

Solid Roof
520

MODULAR CONSTRUCTION SYSTEM AND METHOD FOR PRODUCING A ROOF MODULE

BACKGROUND AND SUMMARY OF THE INVENTION

The invention relates to a modular construction system for producing a plurality of design variants of a roof module and to a method for producing such roof modules.

Modular production techniques are being increasingly used in motor car construction, wherein certain component groups are separately joined away from the main production line and then incorporated as a finished module again into the main production line. In particular, the production of roof modules according to this principle can be derived from the prior art as generally known. A plurality of roof variants is generally offered for a motor car type, for example solid roofs, sliding roofs, panoramic roofs and the like. To date the roof modules for these design variants have also differed in how they were connected to the rest of the motor car shell. Panoramic glass roofs for example are generally stiffened with a sheet metal frame and adhesively bonded into the shell from above. Other roof variants are joined to the shell from below and often require additional assembly parts and greater assembly expenditure.

For different roof variants of a motor car, therefore, it is disadvantageous that a plurality of assembly stations must be provided in the main production line as each roof variant, as described, is connected to the shell of the motor car in a different way.

Exemplary embodiments of the present invention provide a modular construction system and a method for producing a roof module, with which different design variants of roof modules can be produced that can be connected to a motor car shell in the same way.

Such a modular construction system serves for the production of a plurality of design variants of a roof module for a motor car. In this regard, a plurality of design-variant-specific adapter elements and a plurality of design-variant-specific planar elements are provided. By means of respectively at least one adapter element a respective planar element can be connected to a frame, forming a roof opening, in particular of a shell of the motor car. The adapter elements create a uniform connection interface between the roof and the shell in such a way that all roof modules that can be produced using the modular construction system can be connected to the motor car shell in the same way. It is thus no longer necessary—as known from the prior art—for each design variant to have its own installation station for the roof module in the motor car shell. Instead, all different modules can be incorporated in the same way into the shell. Both production time and production costs can thereby also be advantageously spared.

The design-variant-specific planar elements hereby include preferably planar elements for sliding roofs and/or panoramic glass roofs and/or lifting and sliding roofs and/or solid roofs. All common design variants of motor car roofs can thereby be advantageously realized by means of one and the same modular construction system. A design-variant-specific cover part is thereby produced from the combination of at least two respective planar elements.

The design-variant-specific adapter elements are preferably formed as frames. It is particularly preferable for the adapter elements to be separated into a front and a rear frame that abut or overlap in the region of the B pillar of the motor car. In order to achieve an additional stiffening of the roof it is possible for an additional transverse reinforcing element to be provided in this area. A respective design-variant-specific cover part is also preferably separated in the region of the B pillar into a front and rear planar element, as in particular the rear region of the cover part often has no differences between different design variants. For example, a sliding roof and a lifting and sliding roof have the same rear planar element. Accordingly, the front planar elements comprising the actual sliding roof or lifting and sliding roof function must be differently formed in the two design variants.

In a further embodiment of the invention a plurality of design-variant-specific functional elements are provided which can be connected to at least one adapter element and/or one planar element. It can hereby be a matter of the actual cover mechanism for moving a sliding roof, an electric drive for movable parts of the roof, window shades, wind deflectors, guide rails or similar.

The invention further relates to a method for producing a roof module for a motor car from a plurality of design variants. Initially, a frame forming a roof opening is provided, in particular of a motor car shell, and then a planar element is selected from a plurality of design-variant-specific planar elements depending upon the desired design variant. In order to connect the planar element to the frame, at least one adapter element assigned to the selected planar element is selected in the next step from a plurality of design-variant-specific adapter elements and the planar element is connected to the frame by means of said adapter elements. The connection of adapter elements and planar elements is preferably thereby carried out by adhesive bonding.

As already described in relation to the modular construction system, the assembly of roof modules of different design variants on the motor car shell can be made uniform so that the number of necessary work stations in the main production line can be reduced.

BRIEF DESCRIPTION OF THE DRAWING FIGURES

The invention and its embodiments will be described in greater detail below by reference to the drawings, in which:

FIG. 5 illustrates a sliding roof, panoramic glass roof, lifting and sliding roof, and a solid roof.

DETAILED DESCRIPTION

Figure 1:
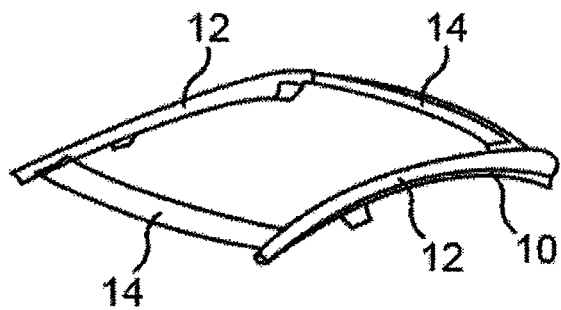
FIG. 1 shows a frame of a motor car shell structure for incorporation of a roof module produced with an exemplary embodiment of the inventive modular construction system.

The shell of a motor car forms—as shown in FIG. 1—a frame 10 for receiving a roof module. This comprises two longitudinal beams 12 and two transverse beams 14.

Figure 2:
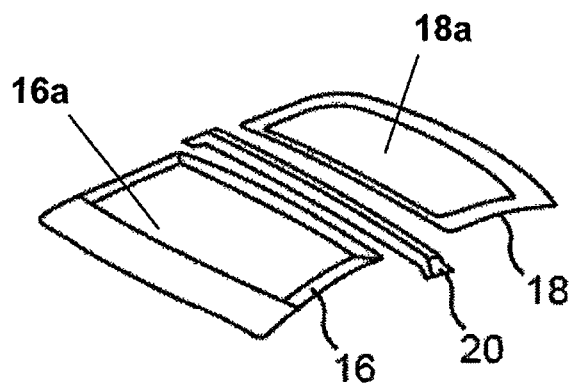
FIG. 2 shows adapter elements for an exemplary embodiment of an inventive modular construction system.

In order to be able to provide different design variants of the roof module—as shown in FIG. 2—adapter elements 16, 18 are connected to the frame 10 formed as part of the shell. The adapter elements 16, 18 are thereby formed as frame-like plastic elements which respectively extend approximately over half of the longitudinal extension of the roof module, are aligned and thus separated in the installation position of the roof module approximately in the region of the B pillar of the motor car. The frame-like adapter elements 16, 18 respectively comprise large openings 16a, 18a that can optionally be covered in a transparent or openable manner. Likewise, in the region of the B pillar and thus between the adapter elements a glass element 20 can be arranged for additional reinforcing of the roof module. The adapter elements 16, 18 serve firstly for the further stiffening of the roof module and secondly in particular for connection of different planar and functional elements to the frame 10. For all design variants of the roof module a uniform connection geometry to the shell is provided by the adapter elements 16, 18, whereby all design variants can thereby be connected in a single work station in the main production line to the frame 10 and thus to the shell.

Figure 3:
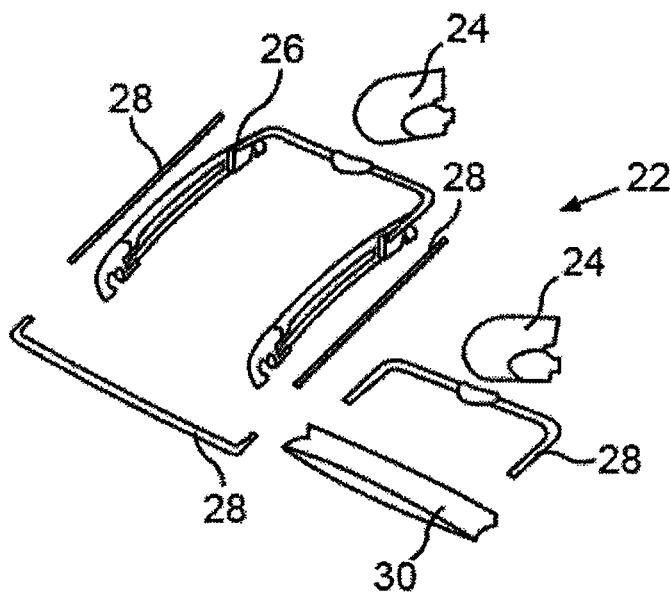
FIG. 3 shows functional elements for an exemplary embodiment of an inventive modular construction system.

After assembly of the adapter elements 16, 18 on the frame 10 additional functional components 22—an overview of which is shown in FIG. 3—are connected to the roof module. It is hereby a question of drive motors 24 for driving sliding roofs, corresponding rail systems 26, in which the sliding roofs run, guide rails 28 and also sunshades 30. The necessary functionality for movable design variants of the roof module is thus provided.

In the final assembly stage the planar elements, which close the roof module outwardly and together form a respective design-variant-specific cover part, are assembled on the structure present thus far. FIG. 4A shows a cover part 32 for a panoramic glass roof. The cover part 34 is divided into two in the region of the B pillar and comprises a front planar element 34 and a rear planar element 36 which are respectively formed transparently. In the region of the abutment 38 between the planar elements 34 and 36, for example, the reinforcement shown in FIG. 2 can be carried out through the transverse bow 20. An only partially transparent or opaque solid roof can also be produced through corresponding selection of the planar elements 34, 36 in this way.

FIG. 4B shows a cover part 40 for a sliding and lifting roof that is also divided into two. The rear planar element 42 is thereby designed in the usual way as a sheet metal outer shell, the front planar element 43 contains the actual outward movement mechanism so that the sliding and lifting roof can be moved out in the direction of the arrow 44.

FIG. 4C shows a cover part 46 for an outwardly extending sliding roof, wherein on the front adapter element 16, which comprises the passage opening 16a, a displaceable roof element 52 is arranged that can initially be moved out in the direction of the arrow 54 and then displaced in the direction of the arrow 56 towards the rear via a rear planar element which is hidden in the illustration shown.

All cover parts can—as shown in FIG. 4A-C—be designed in two parts. It is also possible, however, to design them in one part.

Figure 4:
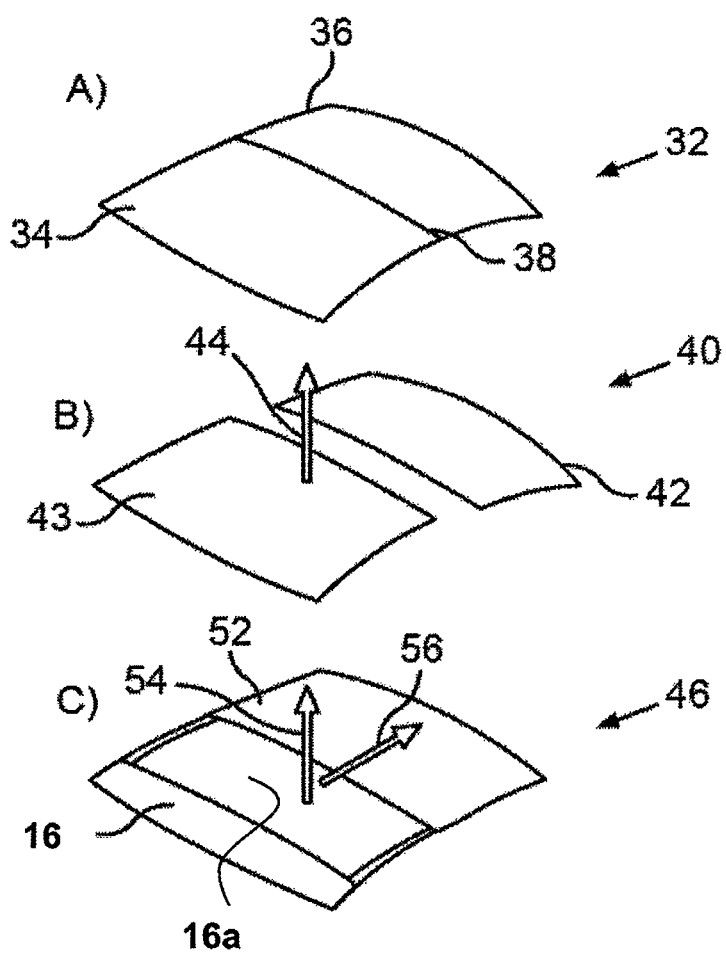
FIG. 4A-4C show design-variant-specific planar elements and cover parts formed therefrom for an exemplary embodiment of an inventive modular construction system.

The respective rear planar elements 36, 42 of the three variants shown in FIG. 4 are arranged via the respective adapter element 18 in a fixed manner on the motor car roof. The planar elements can thereby be transparent or translucent and consist of an extensively free choice of materials from glass, plastic or sheet metal. The front planar element 43, 52 can be movable and in particular be designed to open.

It is particularly advantageous to design the roof modules so that they can be introduced, preferably adhesively bonded, from above into a vehicle shell. This simplifies the assembly and reduces the required construction space so that the headroom for vehicle occupants is improved. In comparison with roof modules incorporated from below the water drainage into the wet area shell is also possible so that additional water discharge hoses can be omitted.

FIG. 5 illustrates a sliding roof 505, panoramic glass roof 510, lifting and sliding roof 515, and a solid roof 520.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A modular construction system for producing a plurality of design variants of a roof module for a motor vehicle, comprising:
    a vehicle frame forming an unobstructed roof opening of the motor vehicle, the vehicle frame comprising two longitudinal beams, each having a forward and rear end, a first transverse beam arranged at the forward end of the two longitudinal beams and a second transverse beam arranged at the rear end of the two longitudinal beams;
    a plurality of different types of planar elements;
    a plurality of adapter elements, wherein each of the plurality of adapter elements is configured as a frame with an opening configured to accept a particular one of the different types of planar elements, wherein each of the plurality of adapter elements is configured to be mounted to the unobstructed roof opening of the motor vehicle,
    wherein the roof module is formed by mounting, within the unobstructed roof opening, a combination of two adapter elements, each with a respective planar element installed within the opening of the frame of the adapter element,
    wherein a glass transverse reinforcing element is arranged between the two adapter elements.

2. The modular construction system according to claim 1, wherein the roof module is one of a sliding roof, panoramic glass roof, lifting and sliding roof, or solid roof.

3. The modular construction system according claim 1, wherein the frame of the plurality of adapter elements is plastic.

4. The modular construction system according to claim 1, further comprising:
    a plurality of different functional elements configured for connection to the vehicle frame, at least one of the plurality of adapter elements, or a cover part.

5. A method for producing a roof module for a motor vehicle from a plurality of structural variants, the method comprising the steps of:
    providing a frame that forms an unobstructed roof opening of the motor vehicle, the frame comprising two longitudinal beams, each having a forward and rear end, a first transverse beam arranged at the forward end of the two longitudinal beams and a second transverse beam arranged at the rear end of the two longitudinal beams;
    selecting at least a first and second planar element from a plurality of different types planar elements;
    selecting a first and second adapter element from a plurality of different adapter elements based on the selected first and second planar elements, wherein each of the plurality of different adapter elements are configured as a frame with an opening configured to accept a particular one of the different types of planar elements;
    connecting the selected first and second adapter elements to the unobstructed roof opening;
    arranging a glass transverse reinforcing element between the first and second adapter elements;

inserting the selected first planar element into the opening of the selected first adapter element while the selected first adapter element is connected to the unobstructed roof opening; and inserting the selected second planar element into the opening of the selected second adapter element while the selected second adapter element is connected to the unobstructed roof opening.

6. The modular construction system according to claim 1, wherein the glass transverse reinforcing element is arranged in a region of a B pillar of the motor vehicle.

7. The method of claim 5, further comprising:

connecting a functional element to one of the selected first and second adapter elements while the one of the selected first and second adapter elements is connected to the unobstructed roof opening and before the selected first or second planar elements is inserted into the one of the selected first and second adapter elements.

* * * * *